United States Patent

[11] 3,573,780

[72] Inventor Franklin C. Butterbaugh
409 Newburg Ave., Baltimore, Md. 21228

[21] Appl. No. 763,092
[22] Filed Sept. 27, 1968
[45] Patented Apr. 6, 1971

[54] AUTOMATIC TELEPHONE ALARM SYSTEM
4 Claims, 1 Drawing Fig.

[52] U.S. Cl. .......... 340/248, 179/5
[51] Int. Cl. .......... G08b 21/00
[50] Field of Search .......... 340/248 (C), 216, 409, 333; 179/5, 175.2, 17.53

[56] References Cited

UNITED STATES PATENTS

| | | | |
|---|---|---|---|
| 3,320,473 | 5/1967 | Grafham .......... | 340/248 |
| 3,392,379 | 7/1968 | Thomason et al. .......... | 340/248 |

*Primary Examiner*—Richard Murray
*Assistant Examiner*—Barry Leibowitz
*Attorney*—Walter G. Finch

ABSTRACT: An alarm actuating circuit is disclosed for monitoring the condition of a communication line. As long as a line potential exists, an amplifier is cut off. In the case of a short circuit, open fault on the line or grounding of the battery side of the input to the communication line, the cut off no longer exists and the amplifier closes a relay to sound an alarm. The line current required is so small as to be negligible.

PATENTED APR 6 1971 3,573,780
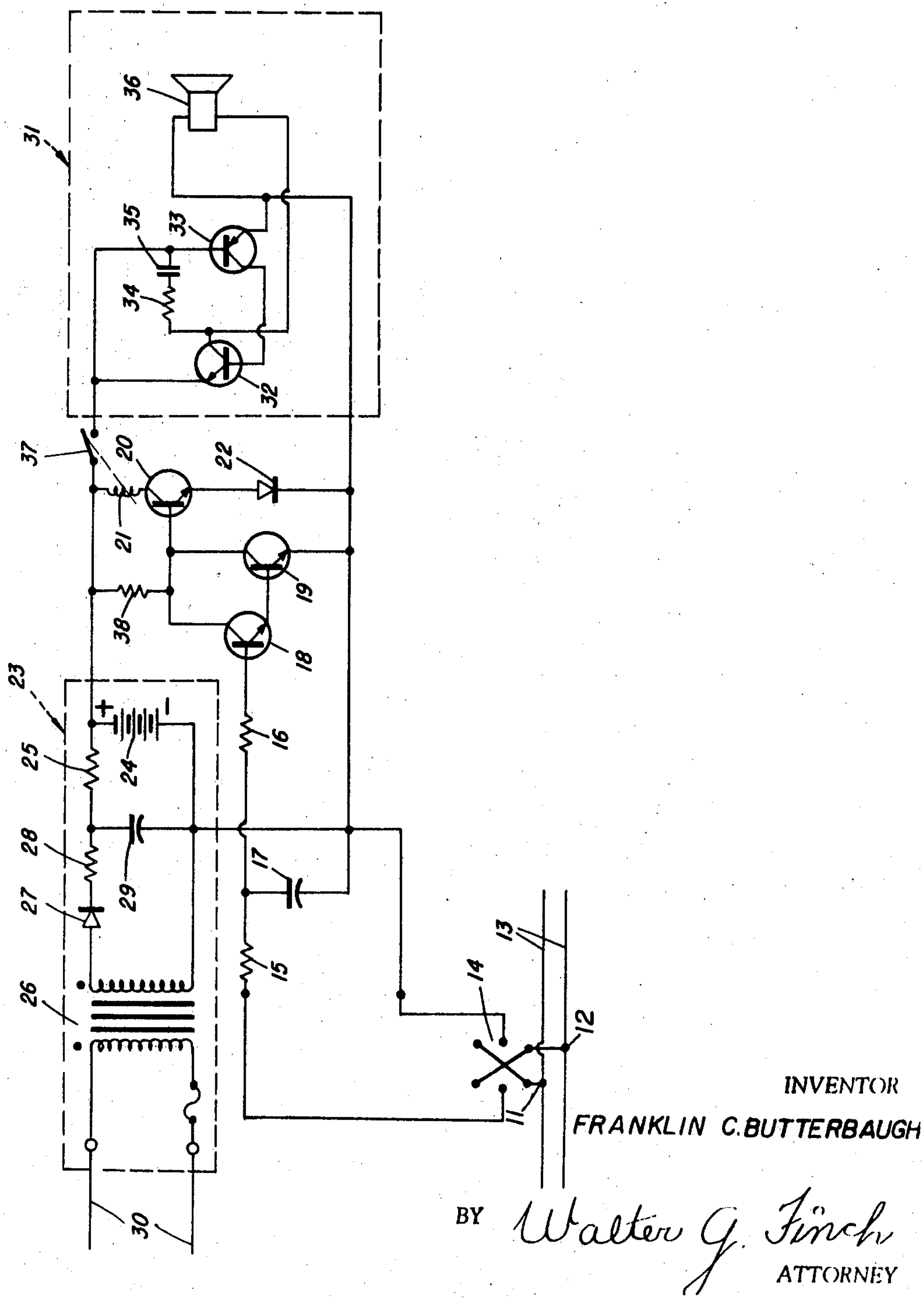
INVENTOR
FRANKLIN C. BUTTERBAUGH
BY Walter G. Finch
ATTORNEY

AUTOMATIC TELEPHONE ALARM SYSTEM

This invention relates generally to electrical communication devices, and more particularly it pertains to alarms. In telephone systems at present there is no way other than picking up the telephone and finding no response whereby a subscriber will be apprised of a nonfunctioning system. Sometimes, it may be several days before it becomes apparent from no calls received that although calls have been placed to him, the central office equipment merely gives a normal ringing signal whereas there actually exists an open line.

It, therefore, is an object of this invention to provide an automatic alarm arrangement for a subscriber communication circuit which will assure the ready condition of service by warning of any abnormal conditions.

Another object of this invention is to provide a bridging type high impedance alarm circuit for monitoring the condition of central battery telephone lines or burglar alarms.

Other objects and attendant advantages of the invention will become more readily apparent and understood from the following detailed specification and accompanying drawing which is a circuit diagram of a preferred embodiment of the present invention.

Referring now to the drawing, the automatic telephone alarm of the present invention has a pair of input terminals 11 and 12. These input terminals 11 and 12 are connected across a two conductor telephone line 13 or other line which has a central battery and is to be monitored.

For periodically testing the alarm, a switch 14 is provided in the input and also is useful in assuring the proper connection to the line, polaritywise, in the initial set up.

Further in the input, a low-pass filter is incorporated and comprises resistors 15 and 16 and a capacitor 17. This filter prevents the false sounding of an alarm from the usual transients on the line occasioned by the normal use of the telephone. Further the resistors 15 and 16 provide high impedance at all times to the telephone line 13 to avoid loading it abnormally by the base of a following transistor 18.

Next in the circuit there is connected with transistor 18, a transistor 19 in a high gain, Darlington amplifier arrangement. The collectors of these transistors 18 and 19 connect to the base of a switching transistor 20 which has a relay coil 21 in its collector output. A protective diode 22 for suppressing inductive surges from the coil 21 is included as shown in the emitter of transistor 20.

The power supply 23 of this automatic telephone alarm essentially consists of a low voltage secondary battery 24. The battery 24 is trickle charged through resistor 25 from a power transformer 26 and rectifier diode 27. Battery 24 is included in the power supply 23 as a fail safe feature in the event the AC current feedway, the power transformer 26 and the rectifier diode 27 is lost or cut off. The smoothing filter comprising resistor 28 and capacitor 29 is included to assure no hum or transients from the power line 30 will pass on the amplifying transistors 18 and 19.

The alarm itself, general reference numeral 31 is designed to give a signal which is distinctive above a bell. The pair of transistors 32, 33 are connected together regeneratively through the series connection of a resistor 34 and capacitor 35. The resulting oscillatory voltage is fed to a loud speaker 36, giving a harsh attention-arousing tone whenever the relay coil 21 is energized and its contact 37 closes.

In operation, the transistors 18 and 19 normally receive a turn-on bias from the line 13 and the switching transistor 20 receives a cutoff bias through the clamping of the base of transistor 20 to a low level (saturated voltage) by transistors 18 and 19. Only a meager current flows through resistor 38 and transistors 18 and 19 thus making the system very economical. Should the telephone line 13 open somewhere, short circuit, or be grounded in the battery side of the input to the telephone line 13, the common battery voltage thereof is lost at the transistors 18 and 19 and they cease conducting; allowing transistor 20 to be turned on by the bias provided by resistor 38.

This current through resistor 38 causes a bias change of input to switching transistor 20 causing it to conduct. The circuit thus established causes relay 21 to close its contact 37 to deliver current from the power supply 23 to the alarm 31 and cause it to sound a warning.

Another use for this invention is in the form of a burglar alarm where the line 13 is a fine wire or tinfoil strip and an associated bias battery replaces the common battery of the telephone line previously mentioned. The fine wire or strip is rigged as two conductors across windows or spaces where an intruder is likely to break them. The broken (or shorted) wire or strip, in similarity to the broken or shorted telephone line 13, operates the alarm as previously explained. It is pointed out that most burglar alarms which function from a broken wire or strip can be defeated by shorting the line. This will sound the alarm if either a break or short occurs.

Obviously many modifications and variations of the present invention are possible in light of the above teachings. It is, therefore, to be understood that within the scope of the appended claims the invention may be practiced otherwise than as specifically described.

I claim:

1. An alarm circuit system for signalling attenuation of a potential between communications lines, comprising: amplifier means adapted for biased cutoff by said potential between the communications lines and connected to the said lines for receiving cutoff bias by the said potential therebetween, said amplifier means including a solid-state device and a low-pass high impedance phase-changing circuit bridging said communications lines, alarm means responsive to the said amplifier means, and power supply means connected to all said amplifier and alarm means, whereby attenuation of the potential between the said communications lines terminates the amplifier cutoff bias causing the amplifier to become actuated by the power supply and to operate the said responsive alarm means thereby signalling said attenuation of the potential.

2. An alarm circuit system as recited in claim 1, and additionally a test switch adapted to reverse the polarity of said bridging of the amplifier means circuit across the communications lines.

3. An alarm circuit system as recited in claim 2, wherein said alarm means includes a normally-open contact relay energized to close the contact by output of the amplifier means on termination of the said cutoff bias, an oscillator circuit adapted for connection to the power supply through a contact of the said responsive relay on termination of the cutoff bias, and a radio speaker in the oscillator circuit responsive to oscillations thereof on said connection with the power supply, for signalling attenuation of the said potential.

4. An alarm circuit system as recited in claim 3, wherein said power supply includes an isolation transformer, a battery, and a rectifier circuit including a filter between said transformer and battery.